US006642927B1

(12) United States Patent
Balakrishnan et al.

(10) Patent No.: US 6,642,927 B1
(45) Date of Patent: Nov. 4, 2003

(54) DIGITAL TAPE DRAWING SYSTEM

(75) Inventors: Ravin Balakrishnan, Toronto (CA); William Arthur Stewart Buxton, Toronto (CA); George William Fitzmaurice, Toronto (CA); Gordon Paul Kurtenbach, Toronto (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/406,088

(22) Filed: Sep. 24, 1999

(51) Int. Cl.[7] .............................................. G06T 11/20
(52) U.S. Cl. ....................................................... 345/442
(58) Field of Search ................................ 345/441–443, 345/964; 700/98, 118, 182, 186, 187

(56) References Cited

U.S. PATENT DOCUMENTS 4,888,713 A * 12/1989 Falk ............................ 364/522
5,228,124 A * 7/1993 Kala et al. ................... 395/161
5,237,647 A * 8/1993 Roberts et al. .............. 395/119

OTHER PUBLICATIONS

Robert Wadlow: World's Tallest Man, Hazardkentucky.com, [online] date unknown, [retrieved on Mar. 19, 2002]. Retrieved from <URL: http://hazardkentucky.com/wadlow.htm>.*
Rediff On The Net: World's Shortest Man, Gul Mohammed, online, 1997, [retreived on Mar. 19, 2002]. Retreived from <URL: http://www.indiaabroad.rediff.com/news/oct/01gul.htm>.*

* cited by examiner

Primary Examiner—Matthew C. Bella
Assistant Examiner—G. F. Cunningham
(74) Attorney, Agent, or Firm—Staas & Halsey LLP

(57) ABSTRACT

A system that provides a bimanual user interface in which an input device is provided for each of the users hands, a left hand (LH) device and a right hand (RH) device. The input devices are used in conjunction with a large format, upright, human scale display at which the user can stand and upon which the input devices are moved. The positions of the input devices on the display are marked by displayed cursors. The system detects the position of the input devices relative to the display and draws a vector corresponding to unfastened tape between positions of cursors of the corresponding input devices and pointing from the LH device to the RH device. By changing the state of the LH input device the unfastened tape can be fastened or pinned along the vector as the user moves the LH device toward the RH device. By changing the state of the RH device, the tape can be unfastened by moving the LH device away from the RH device. Straight lines are drawn by holding the RH fixed while the LH pins the tape. Curves are drawn by moving the RH device while the LH device pins the tape. The switch between straight and curved lines occurs without an explicit mode switch simply by keeping the RH device fixed or moving it. The radius of the curvature of curved lines corresponds to the separation between the LH and RH devices.

60 Claims, 10 Drawing Sheets

LEGEND:
——— FASTENED TAPE                X RIGHT HAND CURSOR
------ UNFASTENED TAPE SEGMENT    O LEFT HAND CURSOR
b=0 TRACKER BUTTON IS NOT PRESSED  b=1 TRACKER BUTTON IS PRESSED

LEGEND:
——— FASTENED TAPE                X RIGHT HAND CURSOR
------ UNFASTENED TAPE SEGMENT    O LEFT HAND CURSOR
b=0 TRACKER BUTTON IS NOT PRESSED  b=1 TRACKER BUTTON IS PRESSED

LEGEND:
— FASTENED TAPE                    X RIGHT HAND CURSOR
- - - - UNFASTENED TAPE SEGMENT    O LEFT HAND CURSOR
b=0 TRACKER BUTTON IS NOT PRESSED  b=1 TRACKER BUTTON IS PRESSED

LEGEND:
— FASTENED TAPE                    X RIGHT HAND CURSOR
- - - - UNFASTENED TAPE SEGMENT    O LEFT HAND CURSOR
b=0 TRACKER BUTTON IS NOT PRESSED  b=1 TRACKER BUTTON IS PRESSED

LEGEND:
― FASTENED TAPE             X RIGHT HAND CURSOR
------ UNFASTENED TAPE SEGMENT   O LEFT HAND CURSOR
b=0 TRACKER BUTTON IS NOT PRESSED   b=1 TRACKER BUTTON IS PRESSED

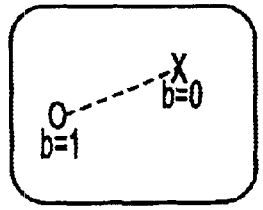

FIG. 9A

LEGEND:
― FASTENED TAPE             X RIGHT HAND CURSOR
------ UNFASTENED TAPE SEGMENT   O LEFT HAND CURSOR
b=0 TRACKER BUTTON IS NOT PRESSED   b=1 TRACKER BUTTON IS PRESSED

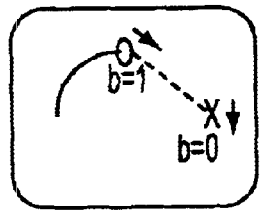

FIG. 9B

LEGEND:
― FASTENED TAPE             X RIGHT HAND CURSOR
------ UNFASTENED TAPE SEGMENT   O LEFT HAND CURSOR
b=0 TRACKER BUTTON IS NOT PRESSED   b=1 TRACKER BUTTON IS PRESSED

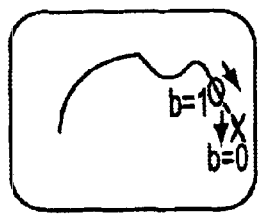

FIG. 9C

LEGEND:
——— FASTENED TAPE   X RIGHT HAND CURSOR
------- UNFASTENED TAPE SEGMENT   O LEFT HAND CURSOR
b=0 TRACKER BUTTON IS NOT PRESSED   b=1 TRACKER BUTTON IS PRESSED

LEGEND:
——— FASTENED TAPE   X RIGHT HAND CURSOR
------- UNFASTENED TAPE SEGMENT   O LEFT HAND CURSOR
b=0 TRACKER BUTTON IS NOT PRESSED   b=1 TRACKER BUTTON IS PRESSED

LEGEND:
———— FASTENED TAPE         X RIGHT HAND CURSOR
------- UNFASTENED TAPE SEGMENT  O LEFT HAND CURSOR
b=0 TRACKER BUTTON IS NOT PRESSED  b=1 TRACKER BUTTON IS PRESSED

LEGEND:
———— FASTENED TAPE         X RIGHT HAND CURSOR
------- UNFASTENED TAPE SEGMENT  O LEFT HAND CURSOR
b=0 TRACKER BUTTON IS NOT PRESSED  b=1 TRACKER BUTTON IS PRESSED

LEGEND:
——— FASTENED TAPE          X RIGHT HAND CURSOR
------ UNFASTENED TAPE SEGMENT  O LEFT HAND CURSOR
b=0 TRACKER BUTTON IS NOT PRESSED   b=1 TRACKER BUTTON IS PRESSED

LEGEND:
——— FASTENED TAPE          X RIGHT HAND CURSOR
------ UNFASTENED TAPE SEGMENT  O LEFT HAND CURSOR
b=0 TRACKER BUTTON IS NOT PRESSED   b=1 TRACKER BUTTON IS PRESSED

DIGITAL TAPE DRAWING SYSTEM

BACKGROUND OF THE INVENTION

1. Field of the Invention

The present invention is directed to a computer tool designed to enhance and replace the physical tape drawing process used in design studios and, more particularly, is directed to tool operation on a large scale display screen, with two handheld input sensors which allows for a smooth modeless transition between creating straight lines and curves.

2. Description of the Related Art

Designers in the automobile industry have traditionally created concept sketches of cars on large scale upright surfaces (walls) that preserve a 1-1 or "full-size" scale factor between the sketch and the final physical car. The main reason for these full-size upright sketches is that designers and managers want to determine and evaluate the principle curves of a design as early as possible in the design process. Working at 1-1 scale is critical to this, if one wants to avoid the unpleasant "surprises" that might otherwise occur if work were done at a reduced scale or on a conventional CRT, for example. While these measures may seem extreme, it is important to recognize that the product being designed could cost up to $1 billion to bring to market. As such, minimizing mistakes is of utmost importance.

An interesting aspect of these concept sketches is that they are created not by using pencils and paint, but mainly by laying down black drafters tape that feels like common masking tape on the drawing surface.

This style of sketching with drafters tape, called "tape drawing", is achieved by using the everyday skills of unrolling the tape with one hand and sliding the other hand along the tape while fastening it on the surface. Even though the mechanics of this naturally two-handed technique are easily explained, the artwork created by experienced practitioners reflects a level of skill that is on a par with any other artistic medium.

Tape drawing has several fundamental advantages over free-form sketching with a pencil, given the large scale size of the sketches. Firstly, it is difficult to draw, freehand, straight lines and smooth continuous curves at this scale. Physical aids such as rulers and french curves would assist the process, however, they would have to be of similar large scale which unfortunately makes them unwieldy for upright use. Drawing with tape, on the other hand, easily facilitates the generation of perfectly straight lines and, due to the slight elasticity of the tape which allows it to be deformed, smooth continuous curves as well. The freehand nature of the interaction is maintained, and yet the tape's capabilities help regulate the user's actions to allow for creation of smooth continuous lines. In addition, tape drawing has the benefit of easily undoing actions and editing compared to drawing with pencils or markers. An undo is achieved simply by lifting the tape off the surface. Editing is performed in two ways: first, by lifting the tape off the surface and relaying it, and second, by tearing off strips of tape and replacing the strips with new tape as required.

While the advantages inherent in drawing with tape have ensured its place in the automotive design process, there are nonetheless several problems with this medium.

Firstly, of all the artists working on the initial design, the skill of the tape artist is the farthest removed from traditional computer graphics systems, and yet, the results of their work must eventually be transferred into the computer. While the resolution and fidelity of the tape from both the input and output perspectives are extremely high, there is no easy way to retain this fidelity when transferring the information to electronic formats. Currently, this transfer process is done laboriously by digitizing the key curves of the tape drawing using a hand-held position sensor and then recreating these curves in a CAD package. This transfer process invariably introduces inaccuracies in the electronic version which then have to be identified and removed. Also, since designers create multiple 2D tape drawings which represent different views (such as a front view and side view) of the under-lying 3D vehicle, these 2D drawings have to be integrated when creating the final 3D model of the vehicle. This integration requires careful alignment and matching of the primary curves of the model, a process that can also introduce errors.

The second major problem with tape drawings is the difficulty in storing and retrieving old drawings. These drawings are typically done on stretched Mylar surfaces which when untacked or removed from the wall contract and distort the drawing. Yet, this must frequently be done to accommodate changes in the engineering drawings that typically underlay the Mylar surface on which the tape drawing is done. Once the drawing is taken down, the purity and accuracy of the original drawing cannot be maintained. Also, the tape itself tends to fall off the Mylar surface after a period of time.

Finally, the physical nature of these drawings preclude easy sharing of design information between different design studios.

What is needed is a digital tape drawing system that will alleviate these disadvantages of physical tape drawing and which would reduce the errors when transferring, retrieving and storing the tape drawings. An electronic system could also provide functionality beyond what is possible using the traditional media.

However, given the aversion of most tape artists to current computer modeling software that require them to learn new skills unrelated to their art, what is needed is a system that will retain the simplicity, fluidity, and capabilities of the physical tape drawing techniques.

SUMMARY OF THE INVENTION

It is an object of the present invention to provide a digital tape drawing system that has the capabilities of drawing with physical tape on a large surface.

It is another object of the present invention to provide a system that allows drawing with a bimanual user interface which allows a user to use both hands to draw.

It is a further object of the present invention to provide a system that allows mode switching without an explicit mode switching operation.

It is also an object of the present invention to provide mode switching responsive to proximity or closeness of the input devices to each other in the interface.

It is an object of the present invention to provide a user interface and display system of a large scale suitable for drawing large objects, such as automobiles, at a 1 to 1 scale.

It is also an object of the present invention to provide mode switching that is dependent on which combination of hand(s) are moving at a given time.

It is another object of the present invention to provide a system that allows for drawing of both curves and straight lines without an explicit mode switch.

It is also an object of the present invention to provide a system that allows the smoothness and continuity of curves to be controlled directly and simply by using the input gestures of the user's two hands.

The above objects can be attained by a system that provides a bimanual user interface in which an input device is provided for each of the users hands. The input devices are used in conjunction with a large format upright display at which the user can stand. The system detects the position of the input devices relative to the display and draws unfastened tape between positions of cursors corresponding to the input devices. By changing the state of the input devices the unfastened tape can be fastened or pinned and unfastened as the user moves one or both input devices relative to each other. During pinning, as the pinning hand moves toward the non-pinning hand, corresponding portions of the unfastened tape are pined. During unfastening a similar correspondence between the reverse movement of the input devices and the unfastened tape occurs. Straight lines are drawn by holding the non-pinning hand fixed while the pinning hand pins the tape. Curves are drawn by moving the non-pinning hand while the pinning hand pins the tape. The switch between straight and curved lines occurs without an explicit mode switch simply by keeping the non-pinning hand fixed or moving it. The radius of the curvature of curved lines corresponds to the separation between the hands as well as the magnitude of simultaneous movement of the two hands. A single input device can also be used to cut the tape and remove it from the display.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 9A–9E show curve and straight line drawing without explicit mode switching.

DESCRIPTION OF THE PREFERRED EMBODIMENTS

Figure 1:
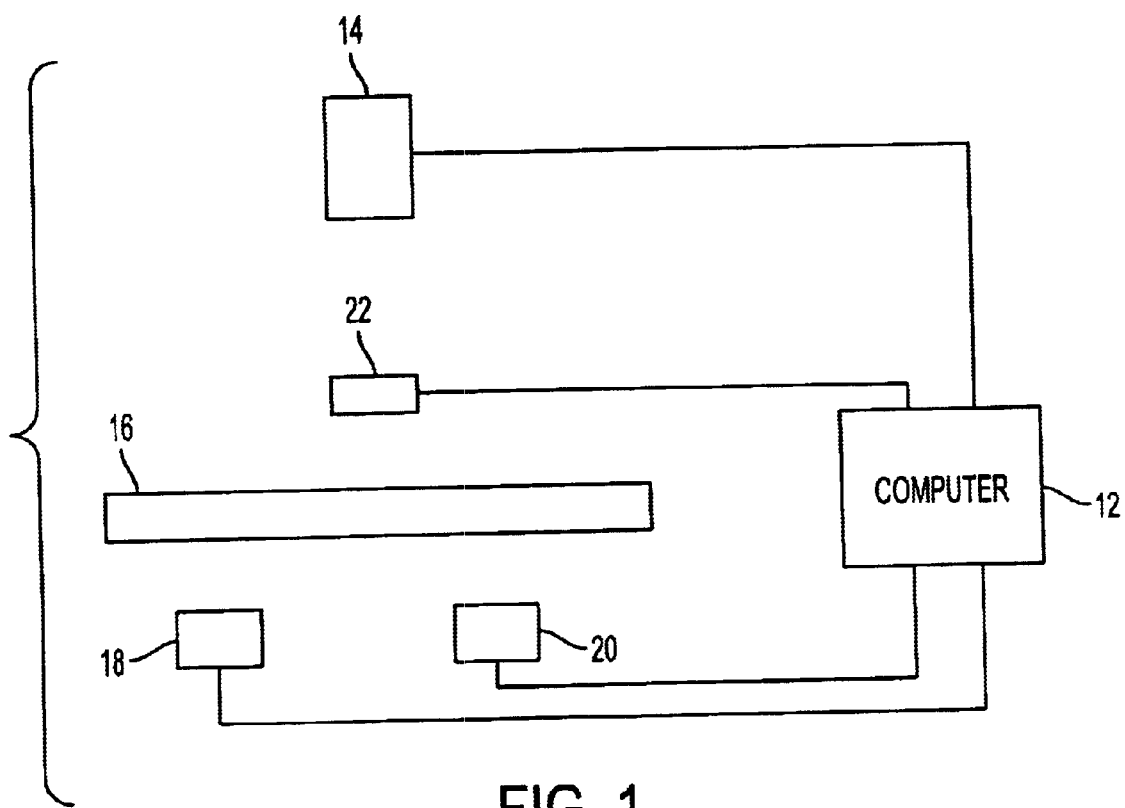
FIG. 1 illustrates the hardware components of the invention.

The present invention alleviates the disadvantages of a traditional tape drawing technique, while retaining its advantages. The invention preferably includes a large scale display screen and a virtual tape displayed on the screen. Two input devices are preferably used to control the tape: the left hand device controls the "pinning" point of the tape, while the right hand device "dispenses" the tape. Thus, a virtual tape is formed between the two hands. The virtual tape preferably is presented as a straight line, however, it conceivably could be a higher order curve. A button on the left hand (LH) device (or pinning device) allows for lines/curves to be drawn on screen while the button is pressed. A button on the right hand (RH) device allows for editing (or cutting) of tape segments. Several important features resulting from the invention are described below.

The invention provides a technique for creating straight lines and curves that allows a smooth, modeless transition between these two types of lines. Current computer drawing techniques allow for either curve drawing OR line drawing as separate tools/modes. The invention allows both to be done within one tool. This is achieved by using two input sensors, one operated by each hand. Mimicking the manipulations of physical tape, the right hand sensor stretches the "virtual tape", while the left hand sensor is used to pin down portions of the virtual tape. This pin position is constrained to lie along the virtual tape from the LH to the RH sensor. To draw a straight line, the right hand sensor is kept stationary, while the left hand sensor runs along the virtual tape towards the RH, pinning it. The pinning action extends the current line. To draw a curve, both hands are moved simultaneously.

The invention allows a smoother curve to be produced than can be obtained by simple free-hand sketching. The existence of a virtual tape vector (from left hand sensor to right hand sensor) ensures that each pinned data point lies on this vector. Thus, the direction of the virtual tape vector constraints the range of pinning positions. The length of the virtual tape vector also allows for varying the smoothness of the generated curve. This is because the input gesture space is "damped" as the vector gets longer. The length of this vector can be controlled in several ways. In a two-handed operation mode, the non-dominant hand (LH) controls the "pin" pivot point and the dominant hand (RH) controls the "tape" pivot point. Holding the "tape" pivot point stationary and moving the "pin" pivot point towards the "tape" pivot point shortens the vector, while moving the "pin" pivot point away from the "tape" pivot point lengthens the vector. Similarly, holding the "pin" pivot point stationary and moving the "tape" pivot point shortens or lengthens the vector depending on direction of movement. In a one-handed operation, handles on a graphical widget (manipulator) holding both sensors are dragged to change vector length (or any other valuator input device can be used, e.g., dial box).

The advantages over the traditional tape drawing technique are that the virtual tape curves can be stored/retrieved electronically in various formats (NURBS, polylines, etc), and easily transferred to CAD packages. Background images (engineering criteria) can be easily overlaid/underlaid to serve as reference material for the designer. More complex editing operations (changing tape width, color) can be included. As well, predefined components or templates of commonly used parts or shapes (e.g., wheel well of cars, bumpers) can be imported from a library. This alleviates having to recreate standard items repeatedly.

The hardware components of the system 10 of the present invention, as depicted in FIG. 1, preferably include a work station type computer 12, such as a Pentium II™ class machine running Microsoft Windows™, capable of using a rear screen projector 14 to project an image being drawn onto screen 16 which is viewed from a side opposite the projector 14. Most automotive design studios have a variety of large scale vertical computer display systems, often called "power-walls." These power-wall displays use state-of-theart rear or front projection technology. Very high resolution is achieved by using multiple projectors side-by-side with a slight overlap in images to create a single seamless large image. Image size can range from 8×6 to 50×10 feet. These displays are typically used to display full-size images of car designs during the design and engineering process. These existing displays can be used as an output medium as well as a surface for digital tape drawings. A typical system could use a Hughes/JVC G1000 digital projector with a true 1280×1024 image back-projected onto a collapsible 8×6 ft. screen. The 8×6 ft. screen generally represents a minimum power-wall size, is on a scale equivalent to the size of a man, and is sufficient to implement the tape drawing interaction techniques described herein that utilize large scale gestures. Large format plasma display screens used in HDTV applications can also be used as the display 16. The invention can also be implemented using much smaller screens such as those found on desktop computers or laptops can also be used. The computer also includes storage, such as disk storage, suitable for storing and distributing the processes of the present invention.

Since tape drawing naturally uses both hands, the invention needs to be able to sense the position of both hands on the display surface. There are several solutions to this sensing problem. These include optical tracking techniques, the use of a transparent digitizing tablet on the display surface, touch sensitive transparent display surfaces, and electromagnetic/ultrasonic trackers. The present invention preferably uses an electromagnetic tracker system having a left hand (LH) position tracker 18 and right hand (RH) position tracker 20 whose positions are sensed by a position sensing module 22. The trackers preferably are held at the surface of the display 16 or actually moved (slid) against the surface of the display 16 and cursors corresponding to the trackers are created on the display 16 at the position of the trackers on the display. The trackers can also be held at some distance from the display 16 but this is not preferred because the correspondence between the position of the tracker and the associated cursor becomes less apparent to the user. A suitable position tracking system is the Ascension Flock-of-Birds six degree-of-freedom electromagnetic tracker system available from Ascension Technologies Inc. Each tracker 18 and 20 is augmented with a switch used to control the effect of the tracker during the drawing process, as will be discussed in more detail later herein.

A first need of a digital tape drawing system is the ability to lay down digital tape segments on the display/drawing surface. The invention replicates, as closely as possible, the capabilities and characteristics of the physical tape laying process. In the physical media, the right hand (or dominant hand) unrolls the tape, while the left hand (or non-dominant hand) slides along the tape while fastening it to the surface. To create a continuous smooth line, tension in the tape must be maintained between the two hands. If the right hand is held steady while the left hand fastens, the result is a straight line. The segment of unfastened tape between the two hands can serve as a preview of the line. Curves are obtained by simultaneously moving the right hand in an appropriate arc while fastening with the left hand.

These techniques are preserved in the digital tape laying system, of the present invention. The present invention operates in a number of different states, as depicted in the state diagram of FIG. 2, that are determined by the positions of buttons on the position trackers 18 and 20 where LB↑ indicates that the left hand button is up or not activated (b=0), LB↓ indicates that the left hand button is down or activated (b=1) with similar symbols for the right hand.

The first state 32 is the stretch tape state and involves the "stretching" of tape from the cursor 0 on the display 16 representing the position of the LH tracker 18 to the cursor X representing the RH tracker 20 on the display 16. If "black" tape is being used this stretched tape or unfastened tape segment shows up on the display as grey or what could be called the shadow of the tape since it is emulating the tape being held in the air apart from the board before it is attached to or stuck to the board. The operations in state 32 will be discussed in more detail later with respect to FIGS. 3A–3B and 4.

The second state 34 is the stick tape state where the stretched tape is stuck to the display by the left hand (tracker 18) moving along the unfastened tape toward the right hand (tracker 20). At the points where the tape is attached or "fastened" to the board the unfastened tape is converted into "black" tape. The operations in this state will be discussed in more detail with respect to FIGS. 5A, 5B and 6.

The third state 36 or terminate tape strip state is where the user has decided that this segment of tape is to end on the display 16. This is similar the user tearing off the end of the tape at the end of a taped line. The operations in this state will be discussed in more detail with respect to FIGS. 5D and 8.

The stick/unstick state 38 is a state where tape that has been attached to the display can be "pulled" off and reattached. The operations in this state will be discussed in more detail with respect to FIGS. 5C, 6 and 7.

The cut tape state 40 is a state where a section of tape that has been attached to the display is removed and will be discussed in more detail with respect to FIGS. 10A–10D and 11.

Figure 3A:
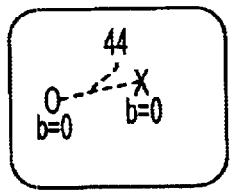
FIGS. 3A and 3B show unfastened tape drawing.
Figure 3B:
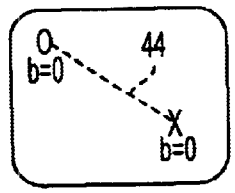

In the laying of tape on the display, by default, the right hand controls a cursor which represents the roll of tape where this "roll-of-tape" cursor is represented by an "X" (see FIGS. 3A and 3B). The left hand controls a second cursor representing the end of the unfastened tape where this "end-of-tape" cursor is represented by "O". Both cursors are controlled in a 1-1 manner by the trackers 18 ("O") and 20 ("X") which operate in an absolute, linear position control mode. A segment 44 of digital tape, represented as a polyline, always extends between the two cursors from the left hand cursor O to the right hand cursor X. This is referred to as the unfastened tape segment. The digital tape is preferably represented as a 1 cm thick line on the preferred display 16. Moving the two hands around effectively moves the unfastened tape segment on the screen. The distance between the two hands determines the length of this unfastened tape segment. FIGS. 3A and 3B illustrate unfastened tape segments 44 (dashed lines) extended between the two cursors when the tracker buttons are not pressed (b=0). The length, position, and orientation of this unfastened tape segment can be changed by moving the cursors as shown by comparing FIGS. 3A and 3B.

Figure 4:
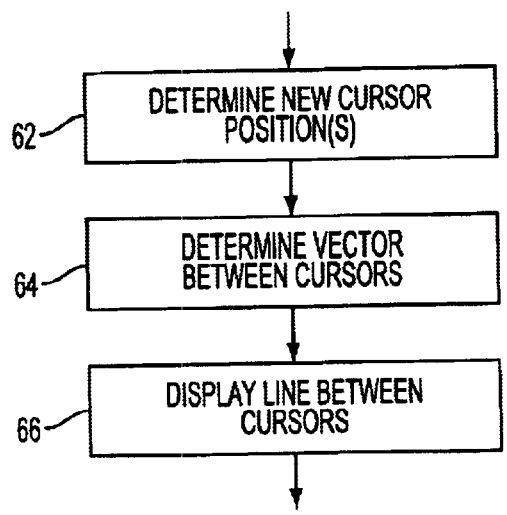
FIG. 4 illustrates the operations performed in drawing unfastened tape.

The operations in the stretch tape state 32 are depicted in FIG. 4. Note that the actions performed are shown in the form of flowcharts operations for convenience of description whereas it is preferable that the operations be performed in an interrupt based environment where the operations are not necessarily performed in the order shown. Additionally, operating in the background, but not shown, are routines that monitor for changes in position of the buttons on the tracker as well as monitor for changes in position of the trackers 18 and 20 themselves. When one or both of the trackers have moved, the system determines 62 (see FIG. 4) the new positions of the corresponding cursors and displays them at the new positions on the display 16. The system then calculates 64 a vector from the left hand cursor (O) to the right hand cursor (X) in display space and creates a display line between the cursors along the vector between the cursors. As a result, each time a tracker is moved the unfastened tape segment moves while in this state 34.

To "fasten" portions of the digital tape, the left hand presses the button on its tracker (left hand button b=1) putting the system into the "fasten mode." This corresponds to the act of pressing down on the tape in the physical version. Releasing the left hand button (b=0) cuts the tape currently being laid at the position of the left hand cursor, as will be discussed below.

In a manner similar to drawing with physical tape, straight lines are created by holding the right hand steady while the left hand, with tracker button pressed, slides along the unfastened tape segment towards the right hand, fastening the tape as it moves. While in the physical version the tape itself serves as a constraint for creating straight lines, the digital version of the present invention enforces this constraint in software by restricting the left hand cursor to move only along the unfastened digital tape segment 44, towards the right hand cursor (X). This ensures that once digitally fastened, the digital tape cannot be unfastened inadvertently (without invoking an edit operation to be described later). If the absolute left hand tracker position strays from the unfastened digital tape segment, the left hand cursor position is determined by a simple projection of LH tracker position to the nearest point on the unfastened tape segment. This is illustrated in FIGS. 5A–5D.

Figure 5A:
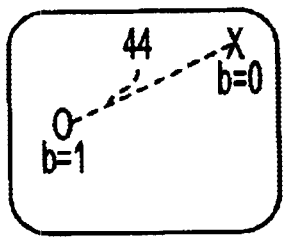
FIGS. 5A–5D show tape sticking, unsticking and terminating.
Figure 5B:
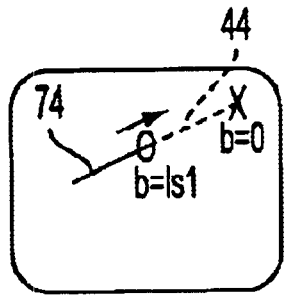
Figure 5C:
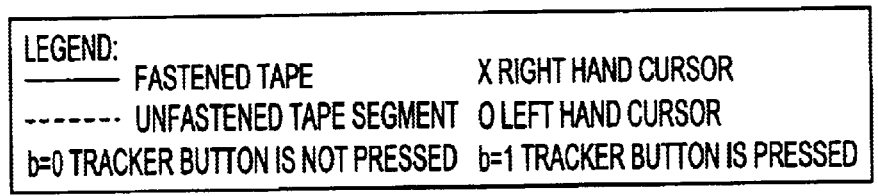
Figure 5C:
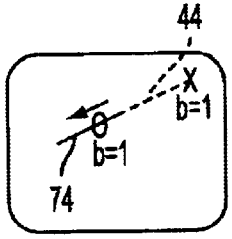
Figure 5D:
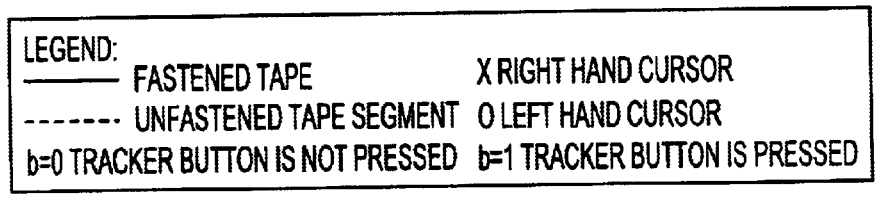
Figure 5D:
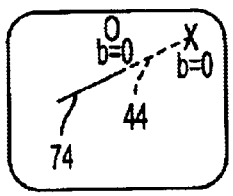

To start taping a straight line, the left hand tracker button is pressed (LH, b=1), as shown in FIG. 5A. Keeping the right hand in a fixed position, the left hand lays down tape 74 as it slides along the unfastened tape segment 44 between the two cursors, as shown in FIG. 5B. Movement of the left hand cursor is constrained to the (closest point on the) unfastened tape segment in the direction towards the right hand cursor. A tape segment can be unfastened (undo) by pressing the right hand tracker button (RH, b=1) and backtracking along the previously laid tape with the left hand as shown in FIG. 5C. That is, the left hand is moved backward along the path of the fastened tape. Again, the movement of the left hand cursor is constrained to the closest point along the fastened tape segment. Releasing the left hand tracker button (LH, b=0) cuts the tape at the location of the left hand cursor, as shown in FIG. 5D, and returns the system to the default state shown in FIGS. 3A and 3B.

Figure 6:
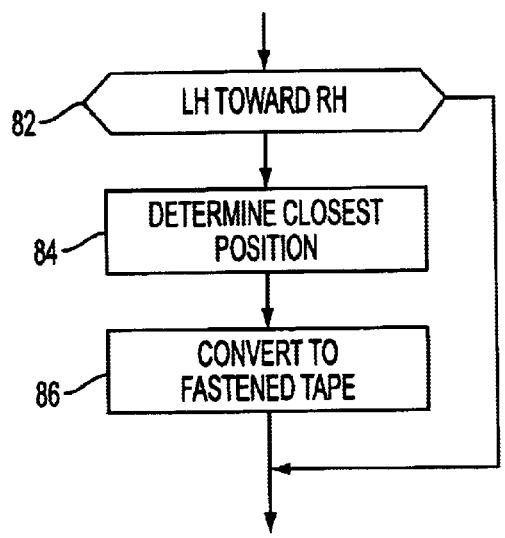
FIG. 6 illustrates the operations in tape sticking or fastening.
Figure 7:
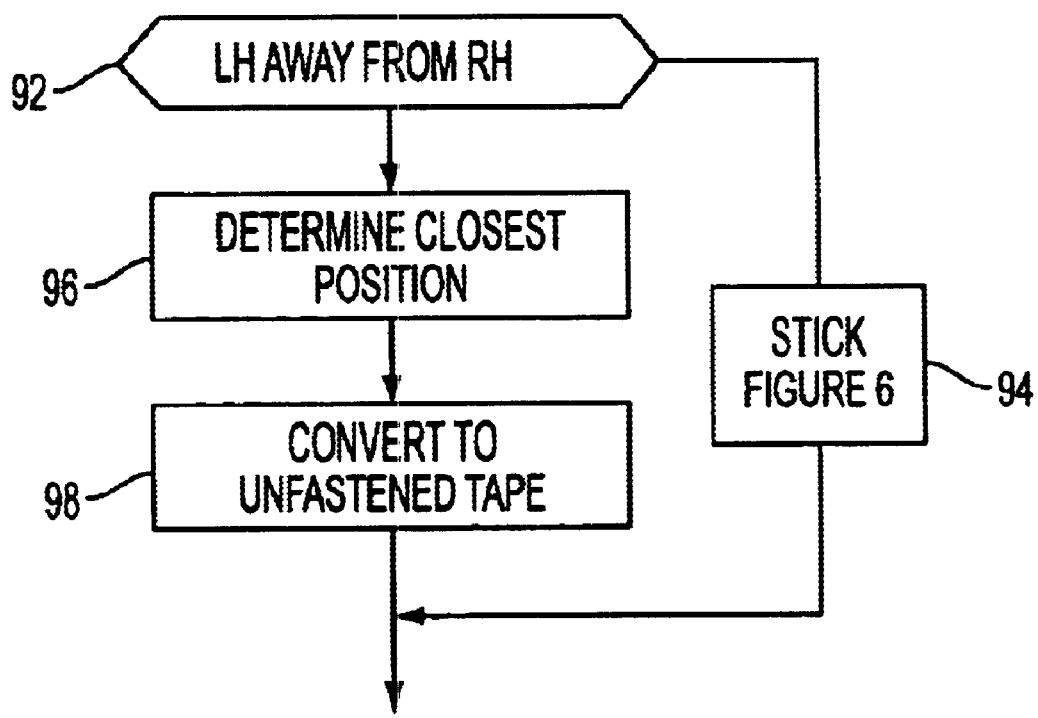
FIG. 7 illustrates the operations of tape unsticking or unfastening.

When fastening tape in state 34, the system, upon the detection of the movement of the left hand tracker 18, determines 82, as shown in FIG. 6, whether the left hand tracker 18 (or cursor O) is moving toward the right hand tracker 20 (or cursor X). If not, such as the left hand is moving away, no action occurs. If the left hand tracker 18 is moving toward the right hand tracker 20, the system determines 84 the closest point on the unfastened tape 44 to the current position of the left hand tracker. This point on the unfastened tape is compared to the most recent point of fastened tape 74 (solid line) or the cursor O and the segment of unfastened tape in between the closest and most recent points is converted 86 from unfastened tape 44 to fastened tape 74 and the cursor is moved to this closest point.

When unsticking tape in state 38 (see FIG. 7), the system, upon the detection of the movement of the left hand tracker 18, determines 92 whether the left hand tracker 18 (or cursor O) is moving away from the right hand tracker 20 (or cursor X). If not, such as the left hand is moving toward the right hand then the stick state of FIG. 6 occurs 94. If the left hand tracker 18 is moving away from the right hand tracker 20, the system determines 96 the closest point on the fastened tape 74 to the current position of the left hand tracker. This point on the fastened tape 74 is compared to the most recent point of unfastened tape 44 or the cursor O and the segment of fastened tape in between the closest and most recent points are converted 98 from fastened tape 74 to unfastened tape 44 and the cursor O is moved to the end of the fastened tape line.

Figure 8:
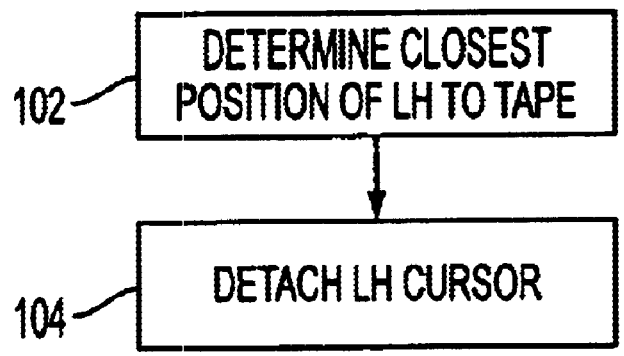
FIG. 8 illustrates the operations in tape termination after sticking.

As shown in FIG. 8, when in the terminate tape state 36, the system determines 102 the closest position of the left hand tracker 18 to the fastened tape 74 and detaches 104 the cursor from the end of the fastened tape line and positions the left hand cursor O under the left hand tracker 18 or at a corresponding offset position as desired.

Creating curves with the invention mimics the physical equivalent. Unlike the creation of straight lines, both hands must move at the same time. Thus, the unfastened tape segment moves while the left hand fastens the tape. The length of the unfastened tape segment (or the length of the vector between the left and right hands cursors/trackers) effectively serves to regulate the smoothness of the resulting curve. Since the left hand cursor is constrained to move along the unfastened tape segment, a longer segment effectively reduces the range of movement of the fastening point controlled by the left hand, resulting in smoother curves (i.e., curve whose tangent changes gradually). A short (approaching zero) unfastened tape segment length reduces the technique to the equivalent of free-hand sketching with the non-dominant hand. A zero or approaching zero vector length occurs when the trackers are at the same relative position on the display—possibly physically on top of each other. An interesting aspect of this technique is that it effectively uses constrained two-handed gestures to control the smoothness of curves. In contrast, most computer tools for generating curves rely on mathematical approaches for specifying smoothness. For example, holding both trackers in a single hand so that there is a fixed distance between the trackers damps out random hand movements during free-hand drawing.

Figure 9D:
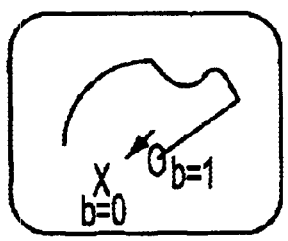
Figure 9E:
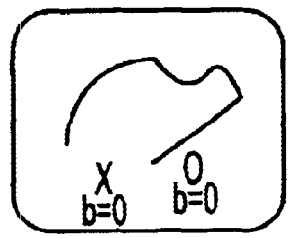

To start taping a curve, the left hand tracker button is pressed (LH, b=1), as depicted in FIG. 9A. While moving the right hand (the X cursor), the left hand (cursor O) lays down tape as it slides along the unfastened tape segment between the two cursors as shown in FIG. 9B. That is, in making a curve both the left and the right hands are moving simultaneously which is in contrast to laying a straight line where the left hand moves while the right hand stays fixed. Movement of the left hand cursor is constrained to the (closest position on the) unfastened tape segment in the direction towards the right hand cursor. A long unfastened tape segment results in smooth curves with a gradually changing tangent, such as shown in FIG. 9B. Reducing the length of the unfastened tape segment, as shown in FIG. 9C, permits the generation of higher variation curves with a more rapidly changing tangent. The length of the unfastened tape segment can be changed on-the-fly simply by moving the two cursors (and corresponding trackers) closer or farther apart. Switching from taping curves to taping straight lines is achieved by simply keeping the right hand cursor in a fixed position while taping with the left hand, as shown in FIG. 9D. An explicit mode switch is not required. Releasing the left hand tracker button cuts the tape, as depicted in FIG. 9E.

From the perspective of two-handed interaction, the tape laying techniques of the present invention are powerful in that they allow for the generation of straight lines and curves without a conventional mode switch action such as the pressing of a switch or the selection of a menu item. The simple act of moving or not moving the right hand while the digital tape is being fastened determines whether a straight line or curve is generated. That is, a mode switch between curves and straight lines (and visa versa) occurs via a motion associated with drawing rather than a motion associated with selection.

As with laying down tape, the invention's editing operations also emulate the physical process. First is the ability to undo the tape currently being laid down. In the physical media, the artist simply has to pull the tape off the surface. In practice, the lack of physical adhesion of the digital tape (we have virtual adhesion) results in users not always operating directly on the display surface, but often hold their hands and "float" a few inches above the surface. Thus, the undo operation preferably requires that the user explicitly press the button on the right hand tracker (RH, b=1). This allows the left hand to pull back on or detach the fastened tape. Since the left hand must be in "fasten mode" (i.e., its tracker button is pressed—LH, b=1), it can quickly relay the tape if desired.

Figure 2:
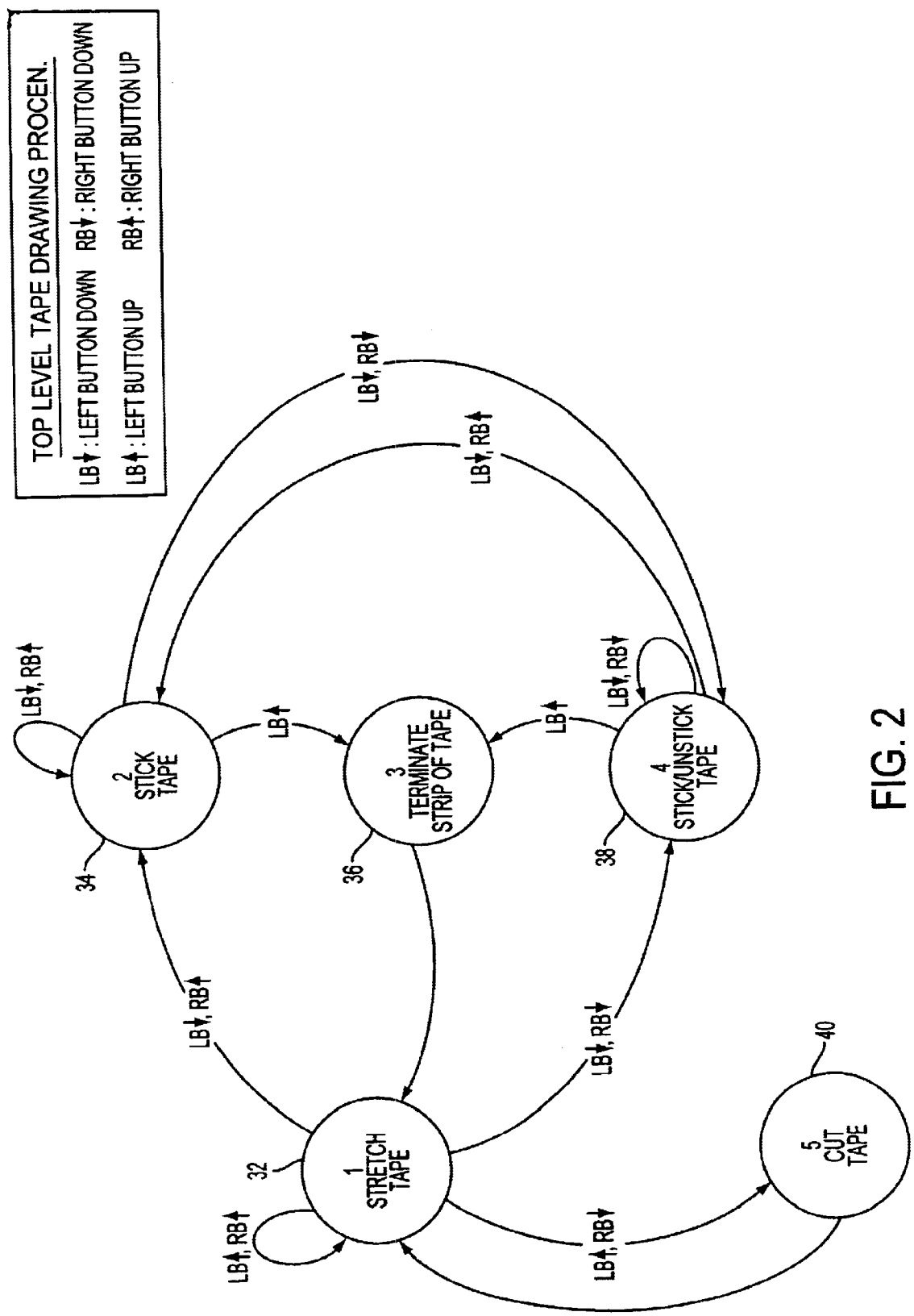
FIG. 2 is a state diagram of the states of the operations performed by the present invention.

The second editing operation is cutting of tape segments and is the cut tape state 40 of FIG. 2. Similar to cutting physical tape, the digital version requires that the user specify two cut points on the tape. This is done by pressing the right hand tracker button, with the left hand tracker button not pressed (i.e., it is not in "fasten mode"), and specifying the two cut points in turn. When the second cut point is specified, the tape segment of a curve between the two points is removed. At any time, a partially executed cut operation can be aborted by pressing the left hand tracker button and returning to "fasten mode."

Figure 10A:
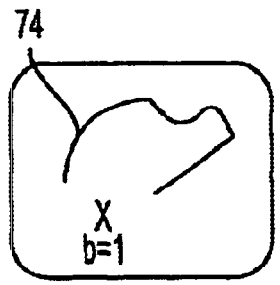
FIGS. 10A–10D show tape cutting.
Figure 10B:
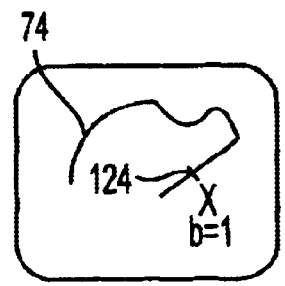
Figure 10C:
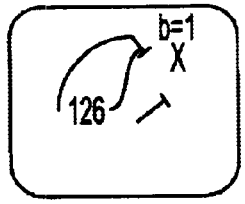
Figure 10D:
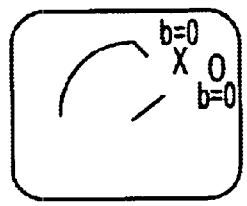

As shown in FIG. 10A, when not in tape laying mode (i.e., the left hand tracker button is not pressed—LH, b=0), pressing the right hand tracker button (RH, b=1) engages the cut mode. The left hand cursor (O) is hidden. With the right hand button pressed, the right hand makes the first cut point 124 by moving the right hand cursor (X) across the tape as shown in FIG. 10B. When the second cut point 126 is specified by again passing the cursor (X) over the tape, the tape segment between the two cut points is removed as shown in FIG. 10C. The process can be repeated to cut additional tape segments if desired. Releasing the right hand tracker button completes the cut operation and returns the system to the default stick tape mode with both cursors displayed as shown in FIG. 10D.

Figure 11:
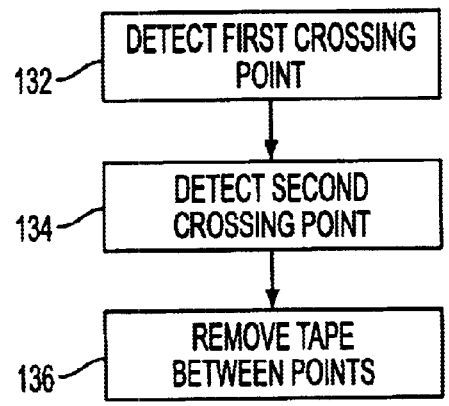
FIG. 11 illustrates the operations in tape cutting.

In performing the cutting operation, the system monitors for and detects 132 the first cut point by detecting the intersection of the right hand cursor X with the fastened tape 74 as shown in FIG. 11. The second cut point detected 134 is the next intersection point of the cursor X and the tape 74. When the second cut point is determined the system removes 136 the tape between the two cut points on the curve.

In traditional tape drawing, tapes of various widths are used to create various effects. For example, a thick physical tape is harder to bend during the laying of a curved tape section than thin tape allowing smoother large radius curves to be created with thicker tape. The width of the tape determines the degree to which the tape that is being stuck on a board can be bent in a direction perpendicular to its width without tearing. This stiffness limitation is simulated in the present invention by limiting the maximum amount of rotation of the vector going from the pinning hand to the non-pinning hand from its original position to an amount corresponding to 1/w where w is the width. Tape width changes can be accomplished by changing the tape parameter or using a different set of input devices.

The tensile strength of physical tape also limits the ability of the tape to bend. This can also be simulated in the present invention by providing a tensile strength parameter that inversely controls the allowed amount of bending of the tape to the width discussed above. That is, with the bending or maximum rotation of the vector limited by 1/t where t is the tensile strength, the system provides tape limited by tensile strength.

In addition to the core operations of laying and editing tape, the present invention also support several additional operations. Traditional tape artists typically draw on a surface with an underlaid grid. The invention provides a similar functionality by conventionally displaying a reference grid on the large scale display 16 that can be toggled on/off via a keyboard. Also, tape drawings are often made with reference to engineering specifications (called the "engineering package") that delimit the unchangeable dimensions of a car's components. The designer has to work within this engineering framework. In the physical media, this package information is simply printed onto large size paper and attached to the tape drawing surface. The invention provides this functionality in two ways. First, the system has the ability to conventionally import this information which is then displayed as a background image in the large screen projection. Second, in the invention, the background of the tape drawing application window is conventionally made transparent and thus tape drawings can be created on top of any other application window. This allows for drawings to be created right over the application used to create the engineering package and, thus, on the top of previously existing drawings. The invention also provides the ability to save and load tape drawings to/from files using conventional file saving techniques. The file format can be read by other 3D automotive modeling applications, such as Alias Autostudio™.

The present invention provides for seamless mode switching that could be applied to other two-handed systems. Based on whether the two cursors are moving simultaneously or in sequential manner, the invention (implicitly) switches between two modes (in the present case, drawing straight lines or curves). In addition to using the temporal characteristics of the motions of the hands, the relative proximity of the hands is also used to invoke or switch to different functionality. For example, when drawing curves in the present invention, keeping the hands (trackers) close together results in high variation curves, whereas moving them apart resulted in smooth, gently varying curves. Another possible use of this proximity information is to display (perhaps by gradually fading in) a palette or menu when the hands are close together.

Alternative input technologies can be used rather than the electromagnetic senor system previously discussed. Wireless mice can be used. Hand held styli or light pens could also be used. If the display screen includes a touch sensitive input screen, such as can be attached to a plasma display panel, the fingers of the user could act as the input devices. The input devices could be provided with more than one button each which would allow the user to cause other actions to occur such as the popping up of a transparent menu or window adjacent to one of the users hands allowing the other hand to be used to select items from the menu.

The system can also be implemented on a desktop computer system using a CRT display screen and two input devices such as two pens on a digitizing tablet.

The cursors can be displayed directly beneath the absolute tracker position as discussed previously herein. However, depending on the position of the user this may result in the user's hand obscuring the cursor. To solve this problem the cursor is offset by a fixed distance from the hand/tracker.

Some users may object to the loss of physical tension between the two hands that is afforded by physical tape. Tensioning devices such as retractable tapes and elastic bands can be used to simulate this tension. In this embodiment an elastic band is attached between the trackers 18 and 22.

Users may sometimes find it difficult to join tape segment ends accurately. This can be solved by features like smart snapping of endpoints when desired which involves causing a tape end to move to the closest endpoint when a join operation is in progress.

A curve inspection technique, called "sighting down the curve" is commonly used in the physical media to check the smoothness of the curve. While it is possible to "sight down a curve" on the large scale display in the digital tape drawing system of the invention, a projection screen having a slight convex curvature facilitates this inspection operation.

Using a pop-up menu or transparent underlay menu or tool palette, the user can be given access to sophisticated editing and painting facilities which would allow for advanced rendering effects such as airbrushing along the edges of curves, to create stylized renderings and cutting tools.

More sophisticated interaction techniques that go beyond mimicking traditional tape operations and properties can also be provided. For example, some curve editing tools found in desktop applications, such as tangency manipulators, would work on a power wall such as created with the present invention.

To compare two tape drawings, a common drawing scale can be used. This allows two or more tape drawings to be superimposed and compared as well as facilitates reusing portions of the drawings.

The tape drawing system of the invention can be integrated with existing curve and surface evaluation computer packages.

The invention can be extended to offer traditional drawing tools such as circles and rectangles which would be a time saving. Importing and displaying clip art and images (e.g., wheels, hub caps, interior console components like vents, stereo controls, basic materials like leather, vinyl, etc.) to augment the tape drawing is within the capabilities of the system.

A "ruler" mode can be provided that would measure the distance between the two trackers in the current tape drawing scale. This would allow the creation of accurately scaled drawings.

A flood "fill region" feature which fills in the space between tape lines with a specified fill, such as a color, reduces the time required for the often quite laborious creation of a fill using strips of physical tape.

A symmetry drawing mode can be added which would lay down duplicate mirror-based curves given a predetermined input plane. This is motivated by the fact that many components in a car have symmetrical counterparts (e.g., two headlights).

The present invention changes from not pinning to pinning by activating the button on the left hand input device. The change in state can also initiated in other ways such as with pressure. For example, touch sensitive screens can sense pressure where a high pressure could indicate a state change.

The present invention has been described with respect to using "digital" tape and a display upon which the tape is displayed. It is also possible for the trackers to be incorporated into a physical tape dispensing devices for unrolling physical tape and into a roller for pressing the tape onto a tape drawing board. The physical tape could be applied to a tape drawing board as in conventional tape drawing while the trackers could be used to capture the laying of the electronic equivalent of the tape as previously discussed.

The present invention has been described with respect to a single user laying tape at one time. It is possible for multiple pairs of input devices to be used at one time allowing a number of different designers to input at the same time. The tape laid by each of the individuals can be distinguished by color.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A drawing system, comprising:

a display;

first and second input devices held by corresponding hands of a user; and a computer determining corresponding positions of said input devices on said display, and drawing a polyline between the corresponding positions on said display during a two-handed drag operation by the user, where the corresponding positions of said input devices and at least one additional previous position contribute to a shape of the polyline.

2. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where the polyline is an unfastened drawing tape segment.

3. A system as recited in claim 1, wherein said display comprises a vertical display having a scale equivalent to a size of a man.

4. A system as recited in claim 1, wherein said computer produces cursors on said display at the corresponding positions.

5. A system as recited in claim 1, wherein when said input devices move the polyline moves.

6. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where the polyline drawn switches between a straight line and a curved line responsive to whether one of said input devices is moved individually or both of said input devices are moved simultaneously.

7. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where said system switches between modes based upon an automatic determination.

8. A system as recited in claim 1, wherein a curvature of a curved line drawn by said system corresponds to a distance between said input devices.

9. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where a curvature of a curved line drawn by said system corresponds to a distance between said input devices and where curve line smoothness corresponds to the distance between said input devices.

10. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where a fixed distance between said first and second positions when said input devices are held in a single hand damps out random hand movements made during freehand drawing.

11. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where when said first and second input devices are at substantially a same position relative to said display, the user can freehand draw curves.

12. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where a distance between said input devices is fixed and the distance controls curve smoothness.

13. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where said polyline corresponds to unfastened drawing tape and when a first hand moves toward a second hand while the system is in a tape stick state, the unfastened tape is converted to fastened tape corresponding to a position of the first hand.

14. A system as recited in claim 13, wherein a point of conversion of unfastened tape to fastened tape is constrained to the polyline.

15. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where the polyline corresponds to fastened drawing tape and when a first hand moves away from a second hand while the system is in a tape unstick state, the fastened tape is converted to unfastened tape corresponding to a position of the first hand.

16. A system as recited in claim 15, wherein a point of conversion of fastened tape to unfastened tape is constrained to the polyline.

17. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where the polyline corresponds to fastened drawing tape and when a first hand crosses the fastened drawing tape at two cut points, the drawing tape between the two cut points along the polyline is removed.

18. A drawing system, comprising:

a display;

first and second input devices held by corresponding hands of a user; and a computer determining corresponding positions of said input devices on said display, and drawing a,polyline between the corresponding positions on said display, where the corresponding positions of said input devices and at least one additional previous position contribute to a shape of the polyline where during curve drawing rotation of a vector between the two positions about a pin point is limited.

19. A system as recited in claim 18, wherein the rotation limitation corresponds to one of tape width and tensile strength.

20. A drawing system, comprising:

a display;

first and second input devices held by corresponding hands of a user;

a computer determining corresponding positions of said input devices on said display, and drawing a polyline between the corresponding positions on said display, where the corresponding positions of said input devices and at least one additional previous position contribute to a shape of the polyline; and a tensioning device connected between said first and second input devices.

21. A drawing system, comprising:

a display;

first and second input devices held by corresponding hands of a user;

a computer determining corresponding positions of said input devices on said display, and drawing a polyline between the corresponding positions on said display, where the corresponding positions of said input devices and at least one additional previous position contribute to a shape of the polyline; and a tape dispensing device holding said first input device and a tape roller holding said second input device.

22. A drawing system, comprising:

a display;

first and second input devices held by corresponding hands of a user; and a computer determining corresponding positions of said input devices on said display, and drawing a polyline between the corresponding positions on said display, where the corresponding positions of said input devices and at least one additional previous position contribute to a shape of the polyline where said display displays a graphic and the polyline is drawn over the graphic.

23. A system as recited in claim 1, wherein the polyline is a curve.

24. A system as recited in claim 1, wherein the polyline is capable of being pinned in place.

25. A drawing system, comprising:

a display;

first and second input devices held by corresponding hands of a user; and a computer determining corresponding positions of said input devices on said display, and drawing a curve between the corresponding positions on said display during a two-handed drag operation by the user, where the corresponding positions of said input devices and at least one additional previous position contribute to a shape of the curve.

26. A drawing system, comprising:

a display;

first and second input devices held by corresponding hands of a user; and a computer determining corresponding positions of said input devices on said display, and drawing a line between the corresponding positions on said display during a two-handed drag operation by the user with the line being capable of being pinned in place on said display.

27. A drawing system, comprising:

a display;

first and second input devices held by corresponding hands of a user; and a computer determining corresponding positions of said input devices on said display, and drawing a line between the corresponding positions on said display with switching between curve and straight line drawing modes being implicit.

28. An electronic tape drawing system, comprising:

a vertical display having a scale equivalent to a size of a man;

first and second input devices held by corresponding hands of a user; and a computer determining corresponding positions of said input devices on said display, producing cursors on said display at the corresponding positions, and drawing a line between the cursors on said display with the line drawing switching between drawing a straight line and a curved line responsive to whether one or both of said input devices are moved simultaneously and with a curvature of the curved line drawn by said system corresponding to a distance between said input devices, and when the line corresponds to unfastened drawing tape and a first hand moves toward a second hand while the system is in a tape stick state, the unfastened tape is converted to fastened tape corresponding to a position of the first hand, when the line corresponds to fastened drawing tape and a first hand moves away from a second hand while the system is in a tape unstick state, the fastened tape is converted to unfastened tape corresponding to a position of the first hand with the point of conversion being constrained to the line, and when the line corresponds to fastened drawing tape and a first hand crosses the fastened drawing tape at two cut points, the drawing tape between the two cut points is removed.

29. A drawing system, comprising:

display means for displaying graphics;

first and second input means devices held by corresponding hands of a user and for designating positions of a line; and means for determining corresponding positions of the input means on the display, drawing a line between the corresponding positions on said display and switching between drawing a straight line and a curved line responsive to whether said input means move simultaneously.

30. A drawing method, comprising:

inputting first and second input positions using corresponding hands of a user during a two-handed drag operation by the user; and determining corresponding positions on a display; and drawing a polyline between the corresponding positions on the display during the two-handed drag operation.

31. A drawing method, comprising:

inputting first and second input positions using corresponding hands of a user; and determining corresponding positions on a display; and drawing a polyline between the corresponding positions on the display where said drawing switches between straight and curved line drawing responsive to whether the first and second input positions move simultaneously.

32. A drawing method, comprising:

inputting first and second input positions using corresponding hands of a user; and determining corresponding positions on a display; and drawing a polyline between the corresponding positions on the display where when a first input position moves toward a second input position while in a tape stick state, unfastened tape is converted to fastened tape corresponding to a the first input position.

33. A drawing method, comprising:

inputting first and second input positions using corresponding hands of a user; and determining corresponding positions on a display; and drawing a polyline between the corresponding positions on the display where when a first input position moves away from a second input position hand while in a tape unstick state, fastened tape is converted to unfastened tape corresponding to the first input position.

34. A drawing method, comprising:

inputting first and second input positions using corresponding hands of a user; and determining corresponding positions on a display; and drawing a polyline between the corresponding positions on the display where when a first input position crosses fastened drawing tape at two cut points, the drawing tape between the two cut points is removed.

35. A computer readable storage for controlling a computer by determining corresponding positions on a display for first and second input positions corresponding hands of a user as the user performs a two-handed drag operation and drawing a polyline between the corresponding positions on said display during the two-handed drag operation, where the corresponding positions and at least one additional previous position contribute to a shape of the polyline.

36. A drawing system, comprising:

a display;

first and second input devices held by corresponding hands of a user; and a computer determining corresponding positions of said input devices on said display, and drawing a polyline between the corresponding positions on said display, wherein the polyline is an unfastened drawing tape segment.

37. A drawing system, comprising:

a display;

first and second input devices held by corresponding hands of a user; and a computer determining corresponding positions of said input devices on said display, and drawing a polyline between the corresponding positions on said display during a two-handed drag operation by the user, wherein said display comprises a vertical display having a scale equivalent to a size of a man.

38. A drawing system, comprising:

a display;

first and second input devices held by corresponding hands of a user; and a computer determining corresponding positions of said input devices on said display, and drawing a polyline between the corresponding positions on said display, wherein the polyline drawn switches between a straight line and a curved line responsive to whether one or both of said input devices are moved simultaneously.

39. A drawing system, comprising:

a display;

first and second input devices held by corresponding hands of a user; and a computer determining corresponding positions of said input devices on said display, and drawing a polyline between the corresponding positions on said display, wherein said system switches between modes based upon an automatic determination.

40. A drawing system, comprising:

a display;

first and second input devices held by corresponding hands of a user; and a computer determining corresponding positions of said input devices on said display, and drawing a polyline between the corresponding positions on said display during a two-handed drag operation by the user, wherein a curvature of a curved line drawn by said system corresponds to a distance between said input devices.

41. A drawing system, comprising:

a display;

first and second input devices held by corresponding hands of a user; and a computer determining corresponding positions of said input devices on said display, and drawing a polyline between the corresponding positions on said display, wherein curve line smoothness corresponds to the distance between said input devices.

42. A drawing system, comprising:

a display;

first and second input devices held by corresponding hands of a user; and a computer determining corresponding positions of said input devices on said display, and drawing a polyline between the corresponding positions on said display, wherein a fixed distance between said first and second positions when said input devices are held in a single hand damps out random hand movements made during freehand drawing.

43. A drawing system, comprising:

a display;

first and second input devices held by corresponding hands of a user; and a computer determining corresponding positions of said input devices on said display, and drawing a polyline between the corresponding positions on said display, wherein when said first and second input devices are at substantially a same position relative to said display, the user can freehand draw curves.

44. A drawing system, comprising:

a display;

first and second input devices held by corresponding hands of a user; and a computer determining corresponding positions of said input devices on said display, and drawing a polyline between the corresponding positions on said display, wherein a distance between said input devices is fixed and the distance controls curve smoothness.

45. A drawing system, comprising:

a display;

first and second input devices held by corresponding hands of a user; and a computer determining corresponding positions of said input devices on said display, and drawing a polyline between the corresponding positions on said display, wherein said polyline corresponds to unfastened drawing tape and when a first hand moves toward a second hand while the system is in a tape stick state, the unfastened tape is converted to fastened tape corresponding to a position of the first hand.

46. A drawing system, comprising:

a display;

first and second input devices held by corresponding hands of a user; and a computer determining corresponding positions of said input devices on said display, and drawing a polyline between the corresponding positions on said display, wherein a point of conversion of unfastened tape to fastened tape is constrained to the polyline.

47. A drawing system, comprising:

a display;

first and second input devices held by corresponding hands of a user; and a computer determining corresponding positions of said input devices on said display, and drawing a polyline between the corresponding positions on said display, wherein the polyline corresponds to fastened drawing tape and when a first hand moves away from a second hand while the system is in a tape unstick state, the fastened tape is converted to unfastened tape corresponding to a position of the first hand.

48. A drawing system, comprising:

a display;

first and second input devices held by corresponding hands of a user; and a computer determining corresponding positions of said input devices on said display, and drawing a polyline between the corresponding positions on said display, wherein a point of conversion of fastened tape to unfastened tape is constrained to the polyline.

49. A drawing system, comprising:

a display;

first and second input devices held by corresponding hands of a user; and a computer determining corresponding positions of said input devices on said display, and drawing a polyline between the corresponding positions on said display, wherein the polyline corresponds to fastened drawing tape and when a first hand crosses the fastened drawing tape at two cut points, the drawing tape between the two cut points along the polyline is removed.

50. A drawing system, comprising:

a display;

first and second input devices held by corresponding hands of a user; and a computer determining corresponding positions of said input devices on said display, and drawing a polyline between the corresponding positions on said display, wherein during curve drawing rotation of a vector between the two positions about a pin point is limited.

51. A drawing system, comprising:

a display;

first and second input devices held by corresponding hands of a user; and a computer determining corresponding positions of said input devices on said display, and drawing a polyline between the corresponding positions on said display, wherein the rotation limitation corresponds to one of tape width and tensile strength.

52. A drawing system, comprising:

a display;

first and second input devices held by corresponding hands of a user;

a computer determining corresponding positions of said input devices on said display, and drawing a polyline between the corresponding positions on said display; and a tensioning device connected between said first and second input devices.

53. A drawing system, comprising:

a display;

first and second input devices held by corresponding hands of a user;

a computer determining corresponding positions of said input devices on said display, and drawing a polyline between the corresponding positions on said display; and a tape dispensing device holding said first input device and a tape roller holding said second input device.

54. A drawing method, comprising:

inputting first and second input positions using corresponding hands of a user; and determining corresponding positions on a display; and drawing a polyline between the corresponding positions on the display, wherein said drawing switches between straight and curved line drawing responsive to whether the first and second input positions move simultaneously.

55. A drawing method, comprising:

inputting first and second input positions using corresponding hands of a user; and determining corresponding positions on a display; and drawing a polyline between the corresponding positions on the display, wherein when a first input position moves toward a second input position while in a tape stick state, unfastened tape is converted to fastened tape corresponding to a the first input position.

56. A drawing method, comprising:

inputting first and second input positions using corresponding hands of a user; and determining corresponding positions on a display; and drawing a polyline between the corresponding positions on the display, wherein when a first input position moves away from a second input position hand while in a tape unstick state, fastened tape is converted to unfastened tape corresponding to the first input position.

57. A drawing method, comprising:

inputting first and second input positions using corresponding hands of a user;

determining corresponding positions on a display; and drawing a polyline between the corresponding positions on the display, wherein when a first input position crosses fastened drawing tape at two cut points, the drawing tape between the two cut points is removed.

58. A drawing system, comprising:

a display;

first and second input devices held by corresponding hands of a user; and a computer determining corresponding positions of said input devices on said display, and drawing a polyline between the corresponding positions on said display during a two-handed drag operation by the user, wherein said display displays a graphic and the polyline is drawn over the graphic.

59. A drawing system, comprising:

a display;

first and second input devices held by corresponding hands of a user; and a computer determining corresponding positions of said input devices on said display, and drawing a polyline between the corresponding positions on said display during a two-handed drag operation by the user, wherein the polyline is capable of being pinned in place.

60. A drawing system, comprising:

a display;

first and second input devices held by corresponding hands of a user; and a computer determining corresponding positions of said input devices on said display, and drawing a polyline between the corresponding positions on said display as the user performs a two handed drag operation by moving both input devices.

* * * * *